(12) United States Patent
Zeng et al.

(10) Patent No.: US 9,866,317 B2
(45) Date of Patent: Jan. 9, 2018

(54) METHOD AND APPARATUS FOR DETECTING POWER OF UPLINK OPTICAL SIGNAL, OPTICAL LINE TERMINAL, AND OPTICAL NETWORK SYSTEM

(71) Applicant: Huawei Technologies Co., Ltd., Shenzhen (CN)

(72) Inventors: Xiaofei Zeng, Shenzhen (CN); Sanzhong Li, Shenzhen (CN); Gang Zheng, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/196,480

(22) Filed: Jun. 29, 2016

(65) Prior Publication Data

US 2016/0308613 A1  Oct. 20, 2016

Related U.S. Application Data

(63) Continuation of application No. PCT/CN2013/090828, filed on Dec. 30, 2013.

(51) Int. Cl.
*H04B 10/079* (2013.01)
*H04J 14/08* (2006.01)
*H04B 10/272* (2013.01)

(52) U.S. Cl.
CPC ..... *H04B 10/07955* (2013.01); *H04B 10/272* (2013.01); *H04J 14/08* (2013.01)

(58) Field of Classification Search
CPC ............................ H04B 10/07955; H04J 14/08
See application file for complete search history.

(56) References Cited

U.S. PATENT DOCUMENTS

| 2009/0202026 A1* | 8/2009 | Huang | H04L 7/033 375/355 |
| 2010/0098413 A1* | 4/2010 | Li | H04B 10/0795 398/38 |
| 2010/0239252 A1* | 9/2010 | Davis | H04L 12/2885 398/58 |
| 2011/0211837 A1* | 9/2011 | Sugawa | H04Q 11/0067 398/67 |
| 2013/0004156 A1 | 1/2013 | Yang et al. | |
| 2013/0259471 A1* | 10/2013 | Wang | H04B 10/07955 398/38 |

(Continued)

FOREIGN PATENT DOCUMENTS

| CN | 102130720 A | 7/2011 |
| CN | 103004108 A | 3/2013 |

(Continued)

*Primary Examiner* — David Payne
*Assistant Examiner* — Casey Kretzer
(74) *Attorney, Agent, or Firm* — Slater Matsil, LLP

(57) ABSTRACT

Embodiments disclose a method and an apparatus for detecting power of an uplink optical signal, an optical line terminal, and an optical network system. The method includes: separately generating a triggering signal that is used for detecting optical power for each uplink optical signal among multiple uplink optical signals to be detected, where the triggering signal of each uplink optical signal has same duration. The method also includes separately detecting power of each uplink optical signal in the duration of the triggering signal of each uplink optical signal.

26 Claims, 5 Drawing Sheets

(56) References Cited

U.S. PATENT DOCUMENTS

2014/0119396 A1\* 5/2014 Dvir .................... H04B 10/564
372/38.02

FOREIGN PATENT DOCUMENTS

| EP | 2413518 A1 | 2/2012 |
| EP | 2634933 A1 | 9/2013 |
| WO | 2014040255 A1 | 3/2014 |

\* cited by examiner

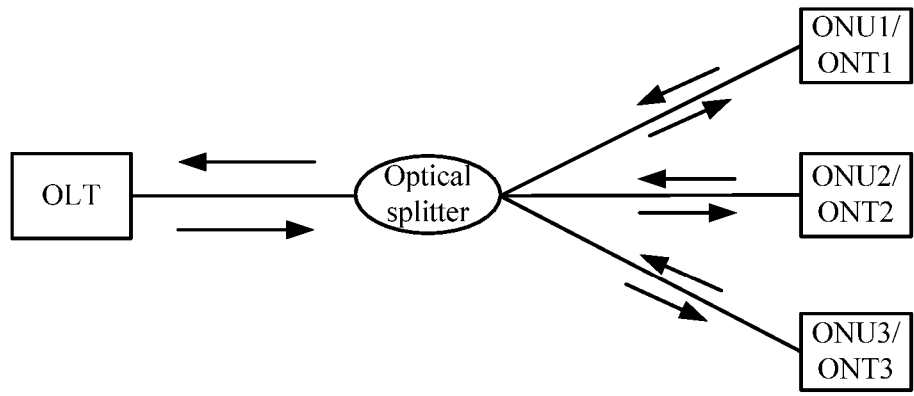

Separately generate a triggering signal that is used for detecting optical power for each uplink optical signal among multiple uplink optical signals to be detected, where the triggering signal of each uplink optical signal has same duration ~S110

Separately detect power of each uplink optical signal in the duration of the triggering signal of each uplink optical signal ~S120

FIG. 2

METHOD AND APPARATUS FOR DETECTING POWER OF UPLINK OPTICAL SIGNAL, OPTICAL LINE TERMINAL, AND OPTICAL NETWORK SYSTEM

CROSS-REFERENCE TO RELATED APPLICATIONS

This application is a continuation of International Patent Application No. PCT/CN2013/090828, filed on Dec. 30, 2013, which is hereby incorporated by reference in its entirety.

TECHNICAL FIELD

Embodiments relate to the communications field, and in particular, to a method and an apparatus for detecting power of an uplink optical signal, an optical line terminal, and an optical network system.

BACKGROUND

In a Gigabit-capable passive optical network (GPON) system, an optical line terminal (OLT) device located at a central office end may be connected to one or more optical network terminals (ONT) or optical network units (ONU) (For ease of description, an ONT is used for description below instead of an ONT and/or an ONU).

The GPON system is a time division multiplexing (TTDM) system. In a downlink direction, the OLT sends, by using an optical signal with a fixed frequency or wavelength, downlink information to all ONTs connected to the OLT, and each ONT may determine, according to its own identity information, information sent by the OLT to itself. In an uplink direction, each ONT emits light in a specific timeslot according to a rule of time division multiplexing uplink optical line bandwidth, that is, according to a scheduling mechanism of dynamic bandwidth allocation (DBA) of the OLT, so as to send uplink information to the OLT by using an optical light.

In the GPON system, transmit optical power and receiver sensitivity of an optical module vary according to different classes of optical modules. For example, for an OLT optical module of class B+ (CLASS B+), optical transmit power is 1.5 to 5 dBm, and receiver sensitivity is ≤−28 dBm. For this type of optical modules, if actual power of a received optical signal is less than −28 dBm, stable running of the system may be affected, which may cause bit errors or may even cause the system to be offline. Therefore, if the system can detect in time a value of the power of the optical signal actually received by the optical module, network robustness can be learned and a pre-warming can be given if necessary.

Likewise, line attenuation capabilities, which can be supported by a system having optical modules of different classes, of an optical distribution network (ODN) are different. For example, an optical module of class B+ (CLASS B+) can support maximum ODN line attenuation of 28 dB. That is, if ODN line attenuation exceeds 28 dB, stable running of the system may be affected, which may cause bit errors or may even cause the system to be offline. If the system can detect a degree of the ODN line attenuation in time, network robustness can be learned and a pre-warning can be given if necessary. A method for detecting actual ODN attenuation by a system is as follows: separately detect optical transmit power of the optical module of the OLT or ONT and optical power actually received by a peer (ONT or OLT) optical module, and calculate the power difference between them, so that ODN attenuation can be determined.

Therefore, it is very meaningful to detect in time actual transmit optical power and actually received optical power of an OLT and ONT optical module.

At present, to detect power of an uplink optical signal of a specific ONT received by an OLT, a triggering signal can be outputted when the specific ONT sends the uplink optical signal, where duration of the triggering signal is the same as duration for sending the uplink optical signal by the specific ONT, that is, the duration of the triggering signal is the same as uplink duration corresponding to uplink bandwidth of the uplink optical signal. The triggering signal is used to trigger a resistor capacitor (RC) circuit inside the OLT to perform charging, so as to detect the power of the uplink optical signal received by the OLT.

However, because uplink bandwidth of each uplink optical signal may be different, accuracy and repeatability for measuring power of an uplink optical signal may be relatively poor.

SUMMARY

Embodiments provide a method and an apparatus for detecting power of an uplink optical signal, an optical line terminal, and an optical network system, which can improve accuracy and repeatability for measuring power of an uplink optical signal.

According to a first aspect, a method for detecting power of an uplink optical signal is provided. The method includes: separately generating a triggering signal that is used for detecting optical power for each uplink optical signal among multiple uplink optical signals to be detected, where the triggering signal of each uplink optical signal has same duration. The method also includes separately detecting power of each uplink optical signal in the duration of the triggering signal of each uplink optical signal.

With reference to the first aspect, in a first possible implementation manner of the first aspect, before the separately generating a triggering signal, which is used for detecting optical power, for each uplink optical signal, the method further includes: separately determining a relationship between a value of uplink bandwidth of each uplink optical signal among the multiple uplink optical signals and a value of a bandwidth threshold; and determining that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

With reference to the first aspect or the first possible implementation manner of the first aspect, in a second possible implementation manner of the first aspect, the separately generating a triggering signal, which is used for detecting optical power, for each uplink optical signal includes: separately determining a detection time of each uplink optical signal according to a start time of each uplink optical signal; and at the detection time of each uplink optical signal, separately generating the triggering signal, which is used for detecting optical power, for each uplink optical signal.

With reference to the first aspect or the first possible implementation manner of the first aspect, in a third possible implementation manner of the first aspect, the separately generating a triggering signal, which is used for detecting optical power, for each uplink optical signal includes: separately determining a detection time of each uplink optical signal according to an end time of each uplink optical signal and the duration; and at the detection time of each uplink optical signal, separately generating the triggering signal, which is used for detecting optical power, for each uplink optical signal.

According to a second aspect, an apparatus for detecting power of an uplink optical signal is provided. The apparatus includes: a generating module, configured to separately generate a triggering signal that is used for detecting optical power for each uplink optical signal among multiple uplink optical signals to be detected, where the triggering signal of each uplink optical signal has same duration. The apparatus also includes a detecting module, configured to separately detect power of each uplink optical signal in the duration of the triggering signal that is of each uplink optical signal and generated by the generating module.

With reference to the second aspect, in a first possible implementation manner of the second aspect, the apparatus further includes: a first determining module, configured to separately determine a relationship between a value of uplink bandwidth of each uplink optical signal among the multiple uplink optical signals and a value of a bandwidth threshold. The apparatus also includes a second determining module, configured to determine that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

With reference to the second aspect or the first possible implementation manner of the second aspect, in a second possible implementation manner of the second aspect, the generating module includes: a first determining unit, configured to separately determine a detection time of each uplink optical signal according to a start time of each uplink optical signal; and a first generating unit, configured to, at the detection time that is, of each uplink optical signal and determined by the first determining unit, separately generate the triggering signal, which is used for detecting optical power, for each uplink optical signal.

With reference to the second aspect or the first possible implementation manner of the second aspect, in a third possible implementation manner of the second aspect, the generating module includes: a second determining unit, configured to separately determine a detection time of each uplink optical signal according to an end time of each uplink optical signal and the duration; and a second generating unit, configured to, at the detection time that is of each uplink optical signal and determined by the second determining unit, separately generate the triggering signal, which is used for detecting optical power, for each uplink optical signal.

According to a third aspect, an optical line terminal (OLT) is provided, including a Media Access Control (MAC) module and an optical module. The MAC module includes a control module, where the control module is configured to separately generate a triggering signal that is used for detecting optical power for each uplink optical signal among multiple uplink optical signals to be detected, where the triggering signal of each uplink optical signal has same duration. The optical module includes an optical power detecting module, where the optical power detecting module receives the triggering signal that is of each uplink optical signal and generated by the control module, and separately detects power of each uplink optical signal in the duration of the triggering signal of each uplink optical signal.

With reference to the third aspect, in a first possible implementation manner of the third aspect, before the control module separately generates the triggering signal, which is used for detecting optical power, for each uplink optical signal, the control module is further configured to: separately determine a relationship between a value of uplink bandwidth of each uplink optical signal among the multiple uplink optical signals and a value of a bandwidth threshold; and determine that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

With reference to the third aspect or the first possible implementation manner of the third aspect, in a second possible implementation manner of the third aspect, the control module is specifically configured to: separately determine a detection time of each uplink optical signal according to a start time of each uplink optical signal; and at the detection time of each uplink optical signal, separately generate the triggering signal, which is used for detecting optical power, for each uplink optical signal.

With reference to the third aspect or the first possible implementation manner of the third aspect, in a third possible implementation manner of the third aspect, the control module is specifically configured to: separately determine a detection time of each uplink optical signal according to an end time of each uplink optical signal and the duration; and at the detection time of each uplink optical signal, separately generate the triggering signal, which is used for detecting optical power, for each uplink optical signal.

With reference to the third aspect or any one possible implementation manner of the first to the third possible implementation manners of the third aspect, in a fourth possible implementation manner of the third aspect, the MAC module further includes: a dynamic bandwidth allocation (DBA) module, configured to allocate uplink bandwidth to an optical network terminal (ONT) connected to the OLT; and a processing module, configured to send, through a data channel, to the ONT, the uplink bandwidth allocated by the DBA module, and receive, through the data channel, uplink data sent by the optical module, where the processing module is further configured to send a control signal to the optical module, so as to control the optical module to receive or send an optical signal.

With reference to the third aspect or any one possible implementation manner of the first to the fourth possible implementation manners of the third aspect, in a fifth possible implementation manner of the third aspect, the optical module further includes: a control circuit, a drive circuit, and a transmitter, where the control circuit controls the drive circuit according to the control signal sent by the MAC module, so as to drive the transmitter to send a downlink optical signal to the ONT connected to the OLT.

With reference to the third aspect or any one possible implementation manner of the first to the fifth possible implementation manners of the third aspect, in a sixth possible implementation manner of the third aspect, the optical module further includes: a receiver and an amplifying circuit, where the receiver is configured to receive an uplink optical signal sent by the ONT connected to the OLT, convert the uplink optical signal into an electrical signal, and output the electrical signal to the amplifying circuit and/or the optical power detecting module; the amplifying circuit amplifies the electrical signal and outputs the amplified electrical signal to the MAC module; and the optical power detecting module detects power of the uplink optical signal according to the triggering signal generated by the control module.

With reference to the sixth possible implementation manner of the third aspect, in a seventh possible implementation manner of the third aspect, the optical power detecting module includes a charging and discharging circuit, where in a case of triggering of the triggering signal generated by the control module and in the duration of the triggering signal, the charging and discharging circuit charges the charging and discharging circuit by using the electrical signal; and the MAC module is further configured to acquire a voltage value after the charging and discharging circuit performs charging, and determine, according to the voltage value, the power of the uplink optical signal received by the receiver.

With reference to the third aspect or any one possible implementation manner of the first to the seventh possible implementation manners of the third aspect, in an eighth possible implementation manner of the third aspect, the optical module further includes a combiner, where the combiner is configured to combine the downlink optical signal transmitted by the optical module and the received uplink optical signal, and output a combined signal to a trunk optical fiber.

According to a fourth aspect, an optical line terminal (OLT) is provided. The optical line terminal is configured to execute the following method: separately generating a triggering signal that is used for detecting optical power for each uplink optical signal among multiple uplink optical signals to be detected, where the triggering signal of each uplink optical signal has same duration; and separately detecting power of each uplink optical signal in the duration of the triggering signal of each uplink optical signal.

With reference to the fourth aspect, in a first possible implementation manner of the fourth aspect, before the optical line terminal separately generates the triggering signal, which is used for detecting optical power, for each uplink optical signal, the optical line terminal is further configured to execute the following method: separately determining a relationship between a value of uplink bandwidth of each uplink optical signal among the multiple uplink optical signals and a value of a bandwidth threshold; and determining that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

With reference to the fourth aspect or the first possible implementation manner of the fourth aspect, in a second possible implementation manner of the fourth aspect, the separately generating, by the optical line terminal, a triggering signal, which is used for detecting optical power, for each uplink optical signal includes: separately determining a detection time of each uplink optical signal according to a start time of each uplink optical signal; and at the detection time of each uplink optical signal, separately generating the triggering signal, which is used for detecting optical power, for each uplink optical signal.

With reference to the fourth aspect or the first possible implementation manner of the fourth aspect, in a third possible implementation manner of the fourth aspect, the separately generating, by the optical line terminal, a triggering signal, which is used for detecting optical power, for each uplink optical signal includes: separately determining a detection time of each uplink optical signal according to an end time of each uplink optical signal and the duration; and at the detection time of each uplink optical signal, separately generating the triggering signal, which is used for detecting optical power, for each uplink optical signal.

According to a fifth aspect, an apparatus for detecting power of an uplink optical signal is provided, where the apparatus includes a processor, a memory, and a bus system; the processor and the memory are connected to each other by using the bus system, the memory is configured to save an instruction, and the processor is configured to execute the instruction saved by the memory; the processor is configured to separately generate a triggering signal that is used for detecting optical power for each uplink optical signal among multiple uplink optical signals to be detected, where the triggering signal of each uplink optical signal has same duration; and the processor is further configured to separately detect power of each uplink optical signal in the duration of the triggering signal of each uplink optical signal.

With reference to the fifth aspect, in a first possible implementation manner of the fifth aspect, before the processor separately generates the triggering signal, which is used for detecting optical power, for each uplink optical signal, the processor is further configured to: separately determine a relationship between a value of uplink bandwidth of each uplink optical signal among the multiple uplink optical signals and a value of a bandwidth threshold; and determine that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

With reference to the fifth aspect or the first possible implementation manner of the fifth aspect, in a second possible implementation manner of the fifth aspect, the separately generating, by the processor, a triggering signal, which is used for detecting optical power, for each uplink optical signal includes: separately determining a detection time of each uplink optical signal according to a start time of each uplink optical signal; and at the detection time of each uplink optical signal, separately generating the triggering signal, which is used for detecting optical power, for each uplink optical signal.

With reference to the fifth aspect or the first possible implementation manner of the fifth aspect, in a third possible implementation manner of the fifth aspect, the separately generating, by the processor, a triggering signal, which is used for detecting optical power, for each uplink optical signal includes: separately determining a detection time of each uplink optical signal according to an end time of each uplink optical signal and the duration; and at the detection time of each uplink optical signal, separately generating the triggering signal, which is used for detecting optical power, for each uplink optical signal.

According to a sixth aspect, an optical network system is provided. The optical network system includes: the optical line terminal (OLT) according to an embodiment of the present invention, at least one optical network terminal (ONT), and an optical splitter, where the at least one ONT is connected to the OLT by using the optical splitter; and the at least one OLT includes a media access control (MAC) module and an optical module, where the MAC module includes a control module, where the control module is configured to separately generate a triggering signal that is used for detecting optical power for each uplink optical signal among multiple uplink optical signals to be detected, where the triggering signal of each uplink optical signal has same duration; and the optical module includes an optical power detecting module, where the optical power detecting module receives the triggering signal that is of each uplink optical signal and generated by the control module, and separately detects power of each uplink optical signal in the duration of the triggering signal of each uplink optical signal.

Based on the foregoing technical solutions, according to the method and the apparatus for detecting power of an uplink optical signal, the optical line terminal, and the optical network system in the embodiments, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

BRIEF DESCRIPTION OF THE DRAWINGS

To describe the technical solutions in the embodiments more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic block diagram of an application scenario according to an embodiment;

FIG. 2 is a schematic flowchart of a method for detecting power of an uplink optical signal according to an embodiment;

DETAILED DESCRIPTION OF ILLUSTRATIVE EMBODIMENTS

Figure 3:
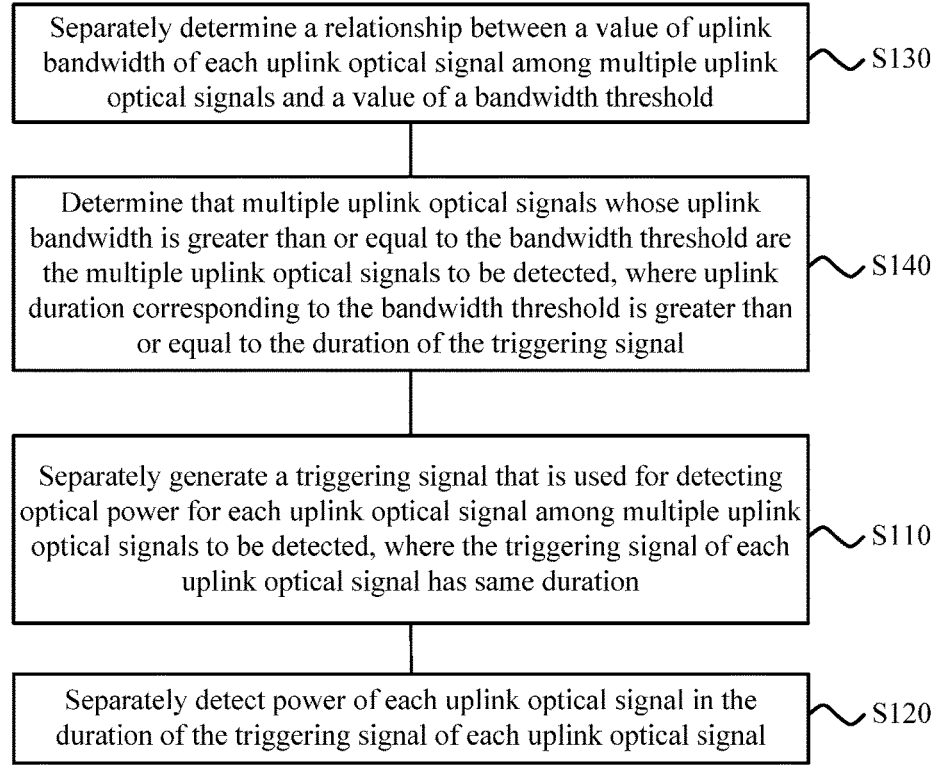
FIG. 3 is another schematic flowchart of a method for detecting power of an uplink optical signal according to an embodiment.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

FIG. 1 shows a schematic block diagram of an application scenario according to an embodiment. As shown in FIG. 1, a passive optical network (PON) system may include an OLT located at a central office end and an ONT/ONU. One OLT may be connected to one or more ONTs/ONUs by using an optical splitter. In a PON system using time division multiplexing (TDM), for example, in a GPON system, different ONTs/ONUs separately send uplink optical signals to the OLT in different timeslots, where duration or bandwidth for sending the uplink optical signals by the ONTs/ONUs can be uniformly allocated by a DBA module of the OLT.

It should be understood that in this embodiment, a transmission direction for transmitting data or an optical signal bearing data from an OLT to an ONT/ONU is referred to as a downlink direction, and correspondingly, the optical signal sent by the OLT to the ONT/ONU is also referred to as a downlink optical signal. Similarly, a transmission direction for transmitting data or an optical signal bearing data from the ONT/ONU to the OLT is referred to as an uplink direction, and correspondingly, the optical signal sent by the ONT/ONU to the OLT is also referred to as an uplink optical signal.

It should further be understood that in this embodiment, a method and an apparatus for detecting power of an uplink optical signal according to this embodiment of the present invention may be applied to a PON system using TDM, such as a GPON system, an Ethernet passive optical network (EPON) system, a 10G EPON system, or a 10G GPON system. For ease of description, the following uses a GPON system as an example for description; however, the present invention is not limited thereto. In addition, for ease of description, the following uses an ONT instead of an ONT and/or an ONU for description; however, the present invention is not limited thereto.

FIG. 2 shows a schematic flowchart of a method 100 for detecting power of an uplink optical signal according to an embodiment. The method 100 can be executed by an apparatus for detecting power of an uplink optical signal. For example, the method 100 may be executed by an OLT. As shown in FIG. 2, the method 100 includes the following steps.

S110. Separately generate a triggering signal that is used for detecting optical power for each uplink optical signal among multiple uplink optical signals to be detected, where the triggering signal of each uplink optical signal has same duration.

S120. Separately detect power of each uplink optical signal in the duration of the triggering signal of each uplink optical signal.

Specifically, to precisely measure power of an uplink optical signal and improve repeatability for measuring power, the apparatus for detecting power of an uplink optical signal may separately generate a triggering signal for each uplink optical signal among multiple uplink optical signals to be detected, where the triggering signal of each uplink optical signal has same duration; and the apparatus for detecting power of an uplink optical signal may separately detect the power of each uplink optical signal in the duration of the triggering signal of each uplink optical signal, so that in a case of triggering of the triggering signal, time for charging performed by a charging circuit that is used to detect optical power and included in the apparatus is the same and fixed when each uplink optical signal to be detected is being detected, and therefore, accuracy and repeatability for measuring power of an uplink optical signal can be improved.

Therefore, according to the method for detecting power of an uplink optical signal in this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

It should be understood that in this embodiment, the apparatus for detecting power of an uplink optical signal generates triggering signals with same duration for all uplink optical signals to be detected, that is, duration of the triggering signals generated by the apparatus for detecting power of an uplink optical signal is fixed and is a constant, and the duration does not change when uplink bandwidth of the uplink optical signal changes.

However, it should be understood that "the duration is fixed and is a constant" is meaningful for a particular apparatus for detecting power of an uplink optical signal, that is, for any particular apparatus for detecting power of an uplink optical signal, duration of triggering signals generated by the apparatus for different uplink optical signals is the same; however, for different apparatuses for detecting power of an uplink optical signal, duration of generated triggering signals may be the same or different.

In this embodiment, a specific value of duration of a triggering signal may be preset when the apparatus for detecting power of an uplink optical signal is delivered from a factory, where a preferred value of the duration of the triggering signal may be determined by considering multiple factors.

In one aspect, the duration of the triggering signal needs to be relatively long duration to ensure sufficiently high detection accuracy. For example, it may be determined that time required when the charging circuit included in the apparatus for detecting power of an uplink optical signal reaches a saturation voltage is the duration of the triggering signal; for another example, it may be determined that time required when the charging circuit reaches 80% of the charging voltage is the duration of the triggering signal; and for example, the duration of the triggering signal is fixed at 600 ns or the like.

That is, in this embodiment, the duration of the triggering signal may be determined by a parameter of the charging circuit, for example, determined by a resistance value and a capacitance value of the charging circuit.

Specifically, for example, for a particular first-order RC circuit, assuming that: $V_o$ is an initial voltage value of a capacitor Y in the RC circuit, $V_{CC}$ is a maximum voltage value of the capacitor Y, $V_t$ is a voltage value of the capacitor Y after charging time T; a capacitance value of the capacitor Y is C, and a resistance value of a resistor X included in the RC circuit is R, then $V_t$ can be determined by using the following equation (1):

$$V_t = V_0 + (V_{CC} - V_0) \times \left[1 - \exp\left(-\frac{T}{RC}\right)\right] \qquad (1)$$

the charging time T can be determined by using the following equation (2):

$$T = RC \cdot \ln\frac{V_{CC} - V_0}{V_{CC} - V_t} = RC \cdot \ln\frac{V_{CC} - V_0}{V_{CC} - \alpha V_{CC}} \qquad (2)$$

where $\alpha$ is a ratio of $V_t$ to $V_{CC}$. Assuming that the initial voltage value of the capacitor Y is 0, that is, $V_o=0$, the equation (2) may be simplified into an equation (3):

$$T = RC \cdot \ln\frac{1}{1 - \alpha} \qquad (3)$$

Therefore, in this embodiment, the duration of the triggering signal may be, for example, determined by the foregoing equation (3). For example, assuming that it is determined that time required when the charging circuit reaches 90% of the charging voltage is the duration of the triggering signal, that is, a coefficient $\alpha$ is 0.9, a resistance value R of the charging circuit is 20 k, and a capacitance value C of the charging circuit is 10 pf, then duration T of the triggering signal is as follows:

$$T = RC \cdot \ln\frac{1}{1 - \alpha} = \ln(10) \times 20 \times 10^3 \times 10 \times 10^{-12} = 460 \times 10^{-9}(s)$$

That is, the duration T of the triggering signal is 460 ns.

It should be understood that this embodiment only uses equations (1) to (3) as examples; however, the present invention is not limited thereto. The duration of the triggering signal may be determined by using another equation.

In another aspect, to improve efficiency of power detection, the duration of the triggering signal cannot be excessively long; otherwise, because light emitting time or uplink duration of the uplink optical signal needs to be greater than or equal to the fixed duration of the triggering signal, a triggering signal with excessively long duration indicates that the uplink optical signal on which detection is performed needs to have relatively large uplink bandwidth. However, in an actual network, uplink bandwidth of each ONT often changes, and relatively small uplink bandwidth is allocated when there is a small traffic volume of the ONT. When a traffic volume of the ONT is relatively small continuously, power detection may fail to be performed within relatively long time, and therefore efficiency for measuring power of an uplink optical signal by a system is affected.

Therefore, to improve efficiency of power detection, for example, a value range of the duration of the triggering signal is from 400 ns to 800 ns; and for another example, the value range of the duration of the triggering signal is from 500 ns to 700 ns. However, the present invention is not limited thereto.

In still another aspect, complexity of calibration and requirements of various device manufacturers and manufacturers of optical-to-electrical conversion modules may further be considered for a preferred value of the duration of the triggering signal; however, the present invention is not limited thereto.

In this embodiment, multiple uplink optical signals may include optical signals of one ONT in multiple different uplink frames, may also include optical signals of multiple ONTs in a same uplink frame, and may also include optical signals of multiple ONTs in multiple different uplink frames. However, it should be understood that, in this embodiment, multiple uplink optical signals are only used as an example for description; however, the present invention is not limited thereto. The method for detecting power of an uplink optical signal according to the present invention may be used to detect power of a single uplink optical signal.

For example, the apparatus for detecting power of an uplink optical signal may generate, for a single uplink optical signal to be detected, a triggering signal used for detecting power of the uplink optical signal, where duration of the triggering signal is a preset value and a constant, that is, the duration of the triggering signal is not a value determined according to uplink duration corresponding to uplink bandwidth of the uplink optical signal; and therefore the apparatus for detecting power of an uplink optical signal detects the power of the uplink optical signal in the duration of the triggering signal.

Therefore, according to the method for detecting power of an uplink optical signal in this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

In this embodiment, preferably, to improve accuracy and repeatability for measuring power of an uplink optical signal, uplink duration corresponding to the uplink bandwidth of the uplink optical signal to be detected needs to be greater than or equal to the fixed duration of the triggering signal, that is, light emitting time of the uplink optical signal to be detected needs to be greater than or equal to the fixed duration of the triggering signal. Therefore, before the power of the uplink optical signal is detected, an uplink optical signal to be detected that meets a requirement may be determined according to the uplink bandwidth of the uplink optical signal.

Specifically, in this embodiment, optionally, as shown in FIG. 3, before the separately generating a triggering signal, which is used for detecting optical power, for each uplink optical signal, the method further includes:

S130. Separately determine a relationship between a value of uplink bandwidth of each uplink optical signal among the multiple uplink optical signals and a value of a bandwidth threshold.

S140. Determine that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

That is, in this embodiment, it is determined that the multiple uplink optical signals whose uplink bandwidth is greater than or equal to the bandwidth threshold are the multiple uplink optical signals to be detected. The uplink duration corresponding to the bandwidth threshold is greater than or equal to the duration of the triggering signal, and therefore uplink duration corresponding to the uplink bandwidth of the multiple uplink optical signals to be detected can be greater than or equal to the fixed duration of the triggering signal, and accuracy and repeatability for measuring power of an uplink optical signal can be improved.

In this embodiment, for a particular uplink optical signal whose uplink bandwidth is less than the bandwidth threshold, uplink bandwidth used for detection may be allocated to the particular uplink optical signal, where the uplink bandwidth used for detection is greater than or equal to the bandwidth threshold, so that the particular uplink optical signal has sufficient uplink duration and can undergo power detection.

For example, for multiple optical signals of one ONT in multiple different uplink frames, when determining that all uplink bandwidth allocated to the ONT to be detected in consecutive N uplink frames is less than the bandwidth threshold and N is greater than or equal to a frame threshold, the apparatus for detecting power of an uplink optical signal allocates uplink bandwidth used for detection to the ONT to be detected, where the uplink bandwidth used for detection is greater than or equal to the bandwidth threshold, and N is a positive integer.

Specifically, for example, the frame threshold may be preset to 5, that is, in at least five consecutive uplink frames, if all the uplink bandwidth allocated to the ONT to be detected is less than the bandwidth threshold, uplink bandwidth greater than or equal to the bandwidth threshold can be allocated to the ONT to be detected, so that the uplink bandwidth determined to be allocated to the ONT to be detected is greater than or equal to the bandwidth threshold, and the power of the uplink optical signal can be detected.

It should be understood that in this embodiment, bandwidth may refer to a data volume passing through within a unit of time. For a PON system with a constant uplink rate, there is a correspondence between bandwidth and duration of a signal. For example, in a GPON system, assuming that one uplink frame is 125 us and corresponding total bandwidth thereof is 1.25 GHz, if uplink bandwidth allocated by an OLT to an ONT is 10 MHz, then duration for sending an uplink optical signal in the uplink frame by the ONT is 1 us.

It should further be understood that in this embodiment, the uplink duration corresponding to the bandwidth threshold may indicate duration of an uplink optical signal whose bandwidth is the bandwidth threshold; for example, in the PON system with a constant uplink rate, the uplink duration corresponding to the bandwidth threshold may indicate duration for sending an uplink optical signal by the ONT when the ONT is allocated with bandwidth equal to the bandwidth threshold. For example, assuming that the bandwidth threshold is 6 MHz, the uplink duration corresponding to the bandwidth threshold is 0.6 us.

It should further be understood that in this embodiment, the multiple uplink optical signals to be detected may indicate multiple uplink optical signals whose duration corresponding to uplink bandwidth is greater than or equal to the duration of the triggering signal; however, the present invention is not limited thereto.

In this embodiment, optionally, the separately generating a triggering signal, which is used for detecting optical power, for each uplink optical signal includes: separately determining a detection time of each uplink optical signal according to a start time of each uplink optical signal; and at the detection time of each uplink optical signal, separately generating the triggering signal, which is used for detecting optical power, for each uplink optical signal.

For example, in this embodiment, the apparatus for detecting power of an uplink optical signal may separately determine the detection time of each uplink optical signal according to the start time of each uplink optical signal; and the apparatus may determine a detection time based on the start time and a delay value, for example, the apparatus may use a time that is 10 ns later than the start time of each uplink optical signal as the detection time of each uplink optical signal; however, the present invention is not limited thereto.

In this embodiment, optionally, the separately generating a triggering signal, which is used for detecting optical power, for each uplink optical signal includes: separately determining a detection time of each uplink optical signal according to an end time of each uplink optical signal and the duration; and at the detection time of each uplink optical signal, separately generating the triggering signal, which is used for detecting optical power, for each uplink optical signal.

For example, the apparatus for detecting power of an uplink optical signal may determine the detection time based on the end time for sending the uplink optical signal by the ONT and the fixed duration of the triggering signal, for example, to determine that a time that is before the end time is the detection time, so that in a whole duration of power detection performed by the apparatus, a strength amplitude value of the uplink optical signal is not zero. For example, an end time of the triggering signal is the same as the end time of the uplink optical signal; and for another example, the detection time is set, so that the end time of the triggering signal is 10 ns earlier than the end time of the uplink optical signal. However, the present invention is not limited thereto.

It should be understood that in this embodiment, for any ONT to be detected, the apparatus for detecting power of an uplink optical signal may first determine a relationship between a value of uplink bandwidth allocated to the ONT to be detected and a value of the bandwidth threshold, so as to determine whether power detection can be performed on the ONT to be detected. When it is determined that the uplink bandwidth allocated to the ONT is greater than or equal to the bandwidth threshold, the apparatus may output a triggering signal with fixed duration to the OLT, so as to trigger power detection for the uplink optical signal; and when it is determined that the uplink bandwidth allocated to the ONT is less than the bandwidth threshold, the apparatus may not output a triggering signal to the OLT and may not perform power detection. However, when no uplink bandwidth allocated to the ONT to be detected in multiple consecutive frames meets a condition, a DBA module of the OLT may dedicatedly allocate relatively large uplink bandwidth used for detection to the ONT to be detected, so that power detection can be performed. This avoids a problem that power detection cannot be performed due to a factor, such as a service volume of the ONT is relatively small. Therefore, not only accuracy and repeatability for measuring power of an uplink optical signal can be improved, but also efficiency of power detection performed by the system can also be improved.

It should be understood that in this embodiment, parameters, such as the bandwidth threshold, the fixed duration of the triggering signal, the frame threshold, and the uplink bandwidth used for detection, are preset values and can be determined based on various factors, and the present invention is not limited to specific description in embodiments.

It should further be understood that in various embodiments, sequence numbers in the foregoing processes do not indicate execution sequences, and the execution sequences of the processes should be determined according to functions and internal logic of the processes, and should not be construed as any limitation on an implementation process of this embodiment.

Therefore, according to the method for detecting power of an uplink optical signal in this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

With reference to FIG. 1 to FIG. 3, the foregoing describes in details the method for detecting power of an uplink optical signal according to an embodiment. With reference to FIG. 4 to FIG. 11, the following describes in details a base station for detecting power of an uplink optical signal, an optical line terminal, and an optical network system according to an embodiment.

Figure 4:
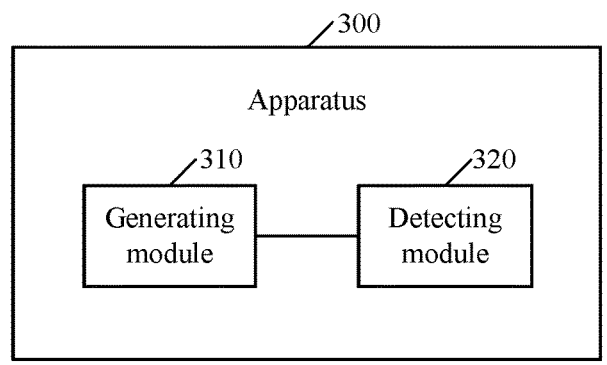
FIG. 4 is a schematic block diagram of an apparatus for detecting power of an uplink optical signal according to an embodiment.

FIG. 4 shows a schematic block diagram of an apparatus 300 for detecting power of an uplink optical signal according to an embodiment of the present invention. As shown in FIG. 4, the apparatus 300 includes: a generating module 310, configured to separately generate a triggering signal that is used for detecting optical power for each uplink optical signal among multiple uplink optical signals to be detected, where the triggering signal of each uplink optical signal has same duration; and a detecting module 320, configured to separately detect power of each uplink optical signal in the duration of the triggering signal that is of each uplink optical signal and generated by the generating module 310.

Therefore, according to the apparatus for detecting power of an uplink optical signal in this embodiment of the present invention, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

In this embodiment, the apparatus 300 for detecting power of an uplink optical signal generates triggering signals with same duration for all uplink optical signals to be detected, that is, duration of the triggering signals generated by the apparatus 300 for detecting power of an uplink optical signal is fixed and is a constant, and the duration does not change when uplink bandwidth of the uplink optical signal changes.

However, it should be understood that "the duration is fixed and is a constant" is meaningful for a particular apparatus for detecting power of an uplink optical signal, that is, for any particular apparatus for detecting power of an uplink optical signal, duration of triggering signals generated by the apparatus for different uplink optical signals is the same; however, for different apparatuses for detecting power of an uplink optical signal, duration of generated triggering signals may be the same or different.

In this embodiment, preferably, to improve accuracy and repeatability for measuring power of an uplink optical signal, uplink duration corresponding to uplink bandwidth of the uplink optical signal to be detected needs to be greater than or equal to the fixed duration of the triggering signal, that is, light emitting time of the uplink optical signal to be detected needs to be greater than or equal to the fixed duration of the triggering signal. Therefore, before the power of the uplink optical signal is detected, an uplink optical signal to be detected that meets a requirement may be determined according to the uplink bandwidth of the uplink optical signal.

Figure 5:
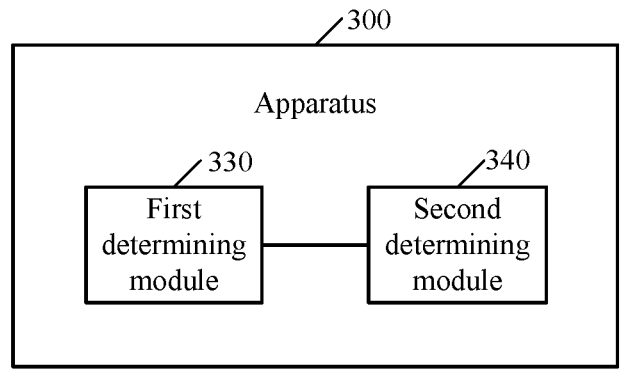
FIG. 5 is another schematic block diagram of an apparatus for detecting power of an uplink optical signal according to an embodiment.

Specifically, in this embodiment, optionally, as shown in FIG. 5, the apparatus 300 further includes: a first determining module 330, configured to separately determine a relationship between a value of uplink bandwidth of each uplink optical signal among the multiple uplink optical signals and a value of a bandwidth threshold; and a second determining module 340, configured to determine that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

That is, in this embodiment, it is determined that multiple uplink optical signals whose uplink bandwidth is greater than or equal to the bandwidth threshold are the multiple uplink optical signals to be detected. The uplink duration corresponding to the bandwidth threshold is greater than or equal to the duration of the triggering signal, and therefore uplink duration corresponding to the uplink bandwidth of the multiple uplink optical signals to be detected can be greater than or equal to the fixed duration of the triggering signal, and accuracy and repeatability for measuring power of an uplink optical signal can be improved.

Figure 6:
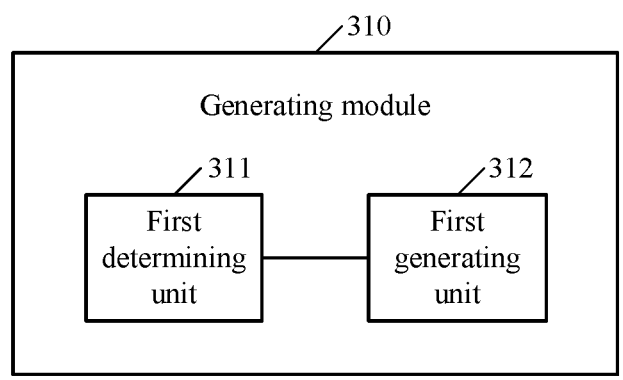
FIG. 6 is a schematic block diagram of a generating module according to an embodiment.

In this embodiment, optionally, as shown in FIG. 6, the generating module 310 includes: a first determining unit 311, configured to separately determine a detection time of each uplink optical signal according to a start time of each uplink optical signal; and a first generating unit 312, configured to, at the detection time that is of each uplink optical signal and determined by the first determining unit 311, separately generate the triggering signal, which is used for detecting optical power, for each uplink optical signal.

Figure 7:
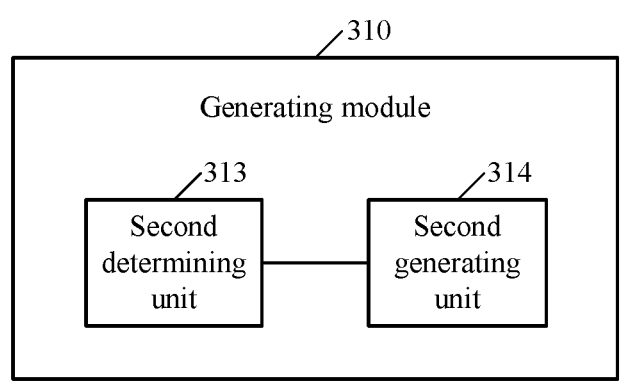
FIG. 7 is another schematic block diagram of a generating module according to an embodiment.

Optionally, as shown in FIG. 7, the generating module 310 includes: a second determining unit 313, configured to separately determine a detection time of each uplink optical signal according to an end time of each uplink optical signal and the duration; and a second generating unit 314, configured to, at the detection time that is of each uplink optical signal and determined by the second determining unit 313, separately generate the triggering signal, which is used for detecting optical power, for each uplink optical signal.

In this embodiment, optionally, the apparatus 300 for detecting power of an uplink optical signal is an OLT; further, the generating module 310 may be integrated into a Media Access Control (MAC) chip of the OLT, that is, the first determining unit 311 and the first generating unit 312 may be integrated into the MAC chip of the OLT, or the second determining unit 313 and the second generating unit 314 may be integrated into the MAC chip of the OLT.

It should be understood that in this embodiment, for any ONT to be detected, the apparatus for detecting power of an uplink optical signal may first determine a relationship between a value of uplink bandwidth allocated to the ONT to be detected and a value of the bandwidth threshold, so as to determine whether power detection can be performed on the ONT to be detected. When it is determined that the uplink bandwidth allocated to the ONT is greater than or equal to the bandwidth threshold, the apparatus may output a triggering signal with fixed duration to the OLT, so as to trigger power detection for the uplink optical signal; and when it is determined that the uplink bandwidth allocated to the ONT is less than the bandwidth threshold, the apparatus may not output a triggering signal to the OLT and may not perform power detection. However, when no uplink bandwidth allocated to the ONT to be detected in multiple consecutive frames meets a condition, a DBA module of the OLT may dedicatedly allocate relatively large uplink bandwidth used for detection to the ONT to be detected, so that power detection can be performed. This avoids a problem that power detection cannot be performed due to a factor, such as a service volume of the ONT is relatively small. Therefore, not only accuracy and repeatability for measuring power of an uplink optical signal can be improved, but also efficiency of power detection performed by a system can also be improved.

It should further be understood that in this embodiment, the apparatus 300 for detecting power of an uplink optical signal according to this embodiment may correspond to an entity for executing the method according to this embodiment, and the foregoing and other operations and/or functions of the modules in the apparatus 300 are separately intended to implement corresponding processes of the methods in FIG. 1 to FIG. 3, and for ease of description, details are not described herein again.

Therefore, according to the apparatus for detecting power of an uplink optical signal in this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

Figure 8:
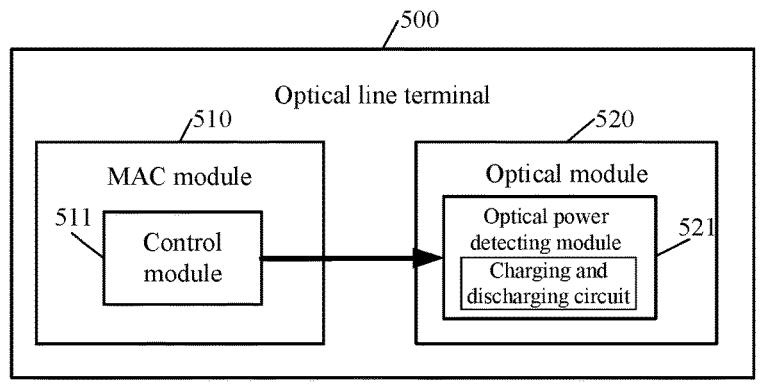
FIG. 8 is a schematic block diagram of an optical line terminal according to an embodiment.

FIG. 8 shows a schematic block diagram of an optical line terminal 500 according to an embodiment. As shown in FIG. 8, the optical line terminal 500 includes a MAC module 510 and an optical module 520, where: the MAC module 510 includes a control module 511, where the control module is configured to separately generate a triggering signal that is used for detecting optical power for each uplink optical signal among multiple uplink optical signals to be detected, where the triggering signal of each uplink optical signal has same duration; and the optical module 520 includes an optical power detecting module 521, where the optical power detecting module 521 receives the triggering signal that is of each uplink optical signal and generated by the control module 511, and separately detects power of each uplink optical signal in the duration of the triggering signal of each uplink optical signal.

Therefore, according to the optical line terminal in this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

Optionally, in this embodiment, before the control module 511 separately generates the triggering signal, which is used for detecting optical power, for each uplink optical signal, the control module 511 is further configured to: separately determine a relationship between a value of uplink bandwidth of each uplink optical signal among the multiple uplink optical signals and a value of a bandwidth threshold; and determine that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

Optionally, in this embodiment, the control module 511 is specifically configured to: separately determine a detection time of each uplink optical signal according to a start time of each uplink optical signal; and at the detection time of each uplink optical signal, separately generate the triggering signal, which is used for detecting optical power, for each uplink optical signal.

Optionally, in this embodiment, the control module 511 is specifically configured to: separately determine a detection time of each uplink optical signal according to an end time of each uplink optical signal and the duration; and at the detection time of each uplink optical signal, separately generate the triggering signal, which is used for detecting optical power, for each uplink optical signal.

Figure 9:
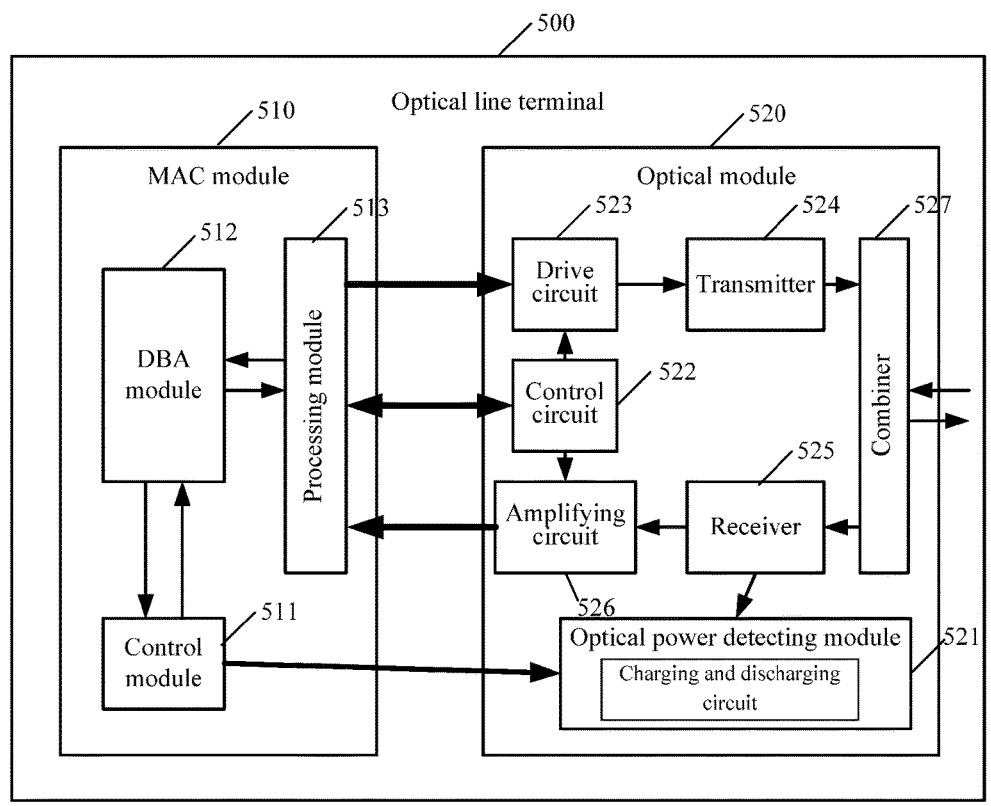
FIG. 9 is another schematic block diagram of an optical line terminal according to an embodiment.

In this embodiment, optionally, as shown in FIG. 9, the MAC module 510 further includes: a dynamic bandwidth allocation (DBA) module 512, configured to allocate uplink bandwidth to an optical network terminal (ONT) connected to the OLT; and a processing module 513, configured to send, through a data channel, to the ONT, the uplink bandwidth allocated by the DBA module 512, and receive, through the data channel, uplink data sent by the optical module 520, where: the processing module 513 is further configured to send a control signal to the optical module 520, so as to control the optical module 520 to receive or send an optical signal.

Optionally, as shown in FIG. 9, the optical module 520 further includes a control circuit 522, a drive circuit 523, and a transmitter 524, where the control circuit 522 controls the drive circuit 523 according to the control signal sent by the MAC module 510, so as to drive the transmitter 524 to send a downlink optical signal to the ONT connected to the OLT.

Optionally, as shown in FIG. 9, the optical module 520 further includes: a receiver 525 and an amplifying circuit 526, where the receiver 525 is configured to receive an uplink optical signal sent by the ONT connected to the OLT, convert the uplink optical signal into an electrical signal, and output the electrical signal to the amplifying circuit 526 and/or the optical power detecting module 521; the amplifying circuit 526 amplifies the electrical signal and outputs the amplified electrical signal to the MAC module 510; and the optical power detecting module 521 detects power of the uplink optical signal according to the triggering signal generated by the control module 511.

It should be understood that in this embodiment, the processing module is configured to control the control circuit by using the control signal, so that the drive circuit drives the transmitter to transmit the downlink optical signal; the processing module may be further configured to receive, through the data channel, uplink data sent by the optical module, where the uplink data is the electrical signal that is converted from the uplink optical signal received by the optical module and then is amplified, and the control signal is a control signal except a triggering signal between the control module in the MAC module and the optical power detecting module in the optical module.

In this embodiment of the present invention, optionally, the optical power detecting module 521 includes a charging and discharging circuit, where in a case of triggering of the triggering signal generated by the control module 511 and in the duration of the triggering signal, the charging and discharging circuit charges the charging and discharging circuit by using the electrical signal; and the MAC module 510 is further configured to acquire a voltage value after the charging and discharging circuit performs charging, and determine, according to the voltage value, the power of the uplink optical signal received by the receiver 525.

In this embodiment, optionally, as shown in FIG. 9, the optical module 520 further includes a combiner 527, where the combiner 527 is configured to combine the downlink optical signal transmitted by the optical module 520 and the received uplink optical signal, and output a combined signal to a trunk optical fiber.

It should be understood that, in this embodiment, for any ONT to be detected, the apparatus for detecting power of an uplink optical signal may first determine a relationship between a value of uplink bandwidth allocated to the ONT to be detected and a value of the bandwidth threshold, so as to determine whether power detection can be performed on the ONT to be detected. When it is determined that the uplink bandwidth allocated to the ONT is greater than or equal to the bandwidth threshold, the apparatus may output a triggering signal with fixed duration to the OLT, so as to trigger power detection for the uplink optical signal; and when it is determined that the uplink bandwidth allocated to the ONT is less than the bandwidth threshold, the apparatus may not output a triggering signal to the OLT and may not perform power detection. However, when no uplink bandwidth allocated to the ONT to be detected in multiple consecutive frames meets a condition, a DBA module of the OLT may dedicatedly allocate relatively large uplink bandwidth used for detection to the ONT to be detected, so that power detection can be performed. This avoids a problem that power detection cannot be performed due to a factor, such as a service volume of the ONT is relatively small. Therefore, not only accuracy and repeatability for measuring power of an uplink optical signal can be improved, but also efficiency of power detection performed by a system can also be improved.

It should further be understood that in this embodiment, the optical line terminal 500 according to this embodiment may correspond to an entity for executing the method according to this embodiment, and may further correspond to the apparatus 300 for detecting power of an uplink optical signal, and the foregoing and other operations and/or functions of the modules in the optical line terminal 500 are separately intended to implement corresponding processes of the methods in FIG. 1 to FIG. 3, and for ease of description, details are not described herein again.

Therefore, according to the optical line terminal according to this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

An embodiment further provides an optical line terminal (OLT), where the optical line terminal is configured to execute the following method: separately generating a triggering signal that is used for detecting optical power for each uplink optical signal among multiple uplink optical signals to be detected, where the triggering signal of each uplink optical signal has same duration; and separately detecting power of each uplink optical signal in the duration of the triggering signal of each uplink optical signal.

Therefore, according to the optical line terminal according to this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

In this embodiment, optionally, before the optical line terminal separately generates the triggering signal, which is used for detecting optical power, for each uplink optical signal, the optical line terminal is further configured to execute the following method: separately determining a relationship between a value of uplink bandwidth of each uplink optical signal among the multiple uplink optical signals and a value of a bandwidth threshold; and determining that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

In this embodiment, optionally, the separately generating, by the optical line terminal, a triggering signal, which is used for detecting optical power, for each uplink optical signal includes: separately determining a detection time of each uplink optical signal according to a start time of each uplink optical signal; and at the detection time of each uplink optical signal, separately generating the triggering signal, which is used for detecting optical power, for each uplink optical signal.

In this embodiment, optionally, the separately generating, by the optical line terminal, a triggering signal, which is used for detecting optical power, for each uplink optical signal includes: separately determining a detection time of each uplink optical signal according to an end time of each uplink optical signal and the duration; and at the detection time of each uplink optical signal, separately generating the triggering signal, which is used for detecting optical power, for each uplink optical signal.

It should be understood that, in this embodiment, for any ONT to be detected, the apparatus for detecting power of an uplink optical signal may first determine a relationship between a value of uplink bandwidth allocated to the ONT to be detected and a value of the bandwidth threshold, so as to determine whether power detection can be performed on the ONT to be detected. When it is determined that the uplink bandwidth allocated to the ONT is greater than or equal to the bandwidth threshold, the apparatus may output a triggering signal with fixed duration to the OLT, so as to trigger power detection for the uplink optical signal; and when it is determined that the uplink bandwidth allocated to the ONT is less than the bandwidth threshold, the apparatus may not output a triggering signal to the OLT and may not perform power detection. However, when no uplink bandwidth allocated to the ONT to be detected in multiple consecutive frames meets a condition, a DBA module of the OLT may dedicatedly allocate relatively large uplink bandwidth used for detection to the ONT to be detected, so that power detection can be performed. This avoids a problem that power detection cannot be performed due to a factor, such as a service volume of the ONT is relatively small. Therefore, not only accuracy and repeatability for measuring power of an uplink optical signal can be improved, but also efficiency of power detection performed by a system can also be improved.

It should further be understood that in this embodiment, the optical line terminal according to this embodiment of the present invention may correspond to an entity for executing the method according to this embodiment, and may further correspond to the apparatus 300 for detecting power of an uplink optical signal and the optical line terminal 500, and the foregoing and other operations and/or functions of the modules in the optical line terminal 500 are separately intended to implement corresponding processes of the methods in FIG. 1 to FIG. 3, and for ease of description, details are not described herein again.

Therefore, according to the optical line terminal in this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

Figure 10:
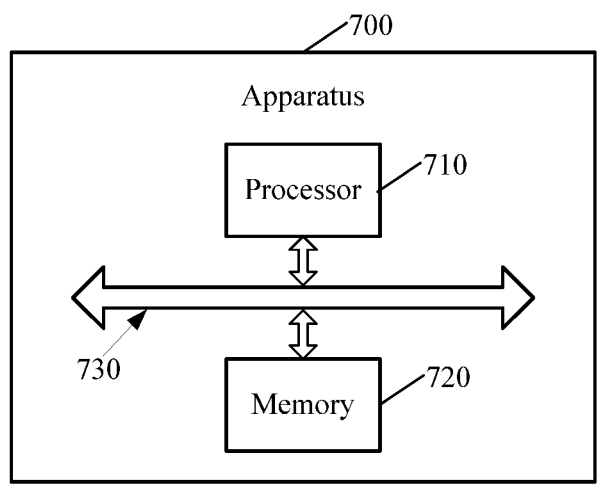
FIG. 10 is still another schematic block diagram of an apparatus for detecting power of an uplink optical signal according to an embodiment.

As shown in FIG. 10, an embodiment further provides an apparatus 700 for detecting power of an uplink optical signal, where the apparatus 700 includes a processor 710, a memory 720, and a bus system 730; the processor 710 and the memory 720 are connected to each other by using the bus system 730, the memory 720 is configured to save an instruction, and the processor 710 is configured to execute the instruction saved by the memory 720. The processor 710 is configured to separately generate a triggering signal that is used for detecting optical power for each uplink optical signal among multiple uplink optical signals to be detected, where the triggering signal of each uplink optical signal has same duration. The processor 710 is further configured to separately detect power of each uplink optical signal in the duration of the triggering signal of each uplink optical signal.

Therefore, according to the apparatus for detecting power of an uplink optical signal in this embodiment of the present invention, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

It should be understood that in this embodiment, the processor 710 may be a central processing unit (CPU), and the processor 710 may be another general purpose processor, a digital signal processor (DSP), an application-specific integrated circuit (ASIC), a field programmable gate array (FPGA) or another programmable logical device, a discrete gate or a transistor logic device, a discrete hardware component, or the like. The general processor may be a microprocessor or the processor may be any regular processor or the like.

The memory 720 may include a read-only memory and a random access memory and provide an instruction and data to the processor 710. A part of the memory 720 may further include a non-volatile random access memory. For example, the memory 720 may further save information about a device type.

In addition to a data bus, the bus system 730 may further include a power supply bus, a control bus, a status signal bus, and the like. However, for clear description, various buses are uniformly marked as the bus system 730 in the figure.

In an implementation process, steps in the foregoing method may be completed by using an integrated logical circuit of hardware in the processor 710 or an instruction in a software form. Steps with reference to the method disclosed in this embodiment of the present invention may be executed by the hardware processor or by a combination of hardware in the processor and a software module. The software module may be located in a storage medium that is mature in this field, such as a random memory, a flash memory, a read-only memory, a programmable read-only memory or an electrically-erasable programmable memory, and a register. The storage medium is located in the memory 720. The processor 710 reads information from the memory 720, and completes the steps in the foregoing method by in combination with the hardware in the processor 710. To avoid repetition, details are not described herein again.

Optionally, as an embodiment, before the processor 710 separately generates the triggering signal, which is used for detecting optical power, for each uplink optical signal, the processor 710 is further configured to: separately determine a relationship between a value of uplink bandwidth of each uplink optical signal among the multiple uplink optical signals and a value of a bandwidth threshold; and determine that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

Optionally, as an embodiment, that the separately generating, by the processor 710, a triggering signal, which is used for detecting optical power, for each uplink optical signal includes: separately determining a detection time of each uplink optical signal according to a start time of each uplink optical signal; and at the detection time of each uplink optical signal, separately generating the triggering signal, which is used for detecting optical power, for each uplink optical signal.

Optionally, as an embodiment, that the separately generating, by the processor 710, a triggering signal, which is used for detecting optical power, for each uplink optical signal includes: separately determining a detection time of each uplink optical signal according to an end time of each uplink optical signal and the duration; and at the detection time of each uplink optical signal, separately generating the triggering signal, which is used for detecting optical power, for each uplink optical signal.

It should be understood that, in this embodiment, for any ONT to be detected, the apparatus for detecting power of an uplink optical signal may first determine a relationship between a value of uplink bandwidth allocated to the ONT to be detected and a value of the bandwidth threshold, so as to determine whether power detection can be performed on the ONT to be detected. When it is determined that the uplink bandwidth allocated to the ONT is greater than or equal to the bandwidth threshold, the apparatus may output a triggering signal with fixed duration to the OLT, so as to trigger power detection for the uplink optical signal; and when it is determined that the uplink bandwidth allocated to the ONT is less than the bandwidth threshold, the apparatus may not output a triggering signal to the OLT and may not perform power detection. However, when no uplink bandwidth allocated to the ONT to be detected in multiple consecutive frames meets a condition, a DBA module of the OLT may dedicatedly allocate relatively large uplink bandwidth used for detection to the ONT to be detected, so that power detection can be performed. This avoids a problem that power detection cannot be performed due to a factor, such as a service volume of the ONT is relatively small. Therefore, not only accuracy and repeatability for measuring power of an uplink optical signal can be improved, but also efficiency of power detection performed by a system can also be improved.

It should further be understood that in this embodiment, the apparatus 700 for detecting power of an uplink optical signal according to this embodiment of the present invention may correspond to an entity for executing the method according to this embodiment, and may further correspond to the apparatus 300 for detecting power of an uplink optical signal and the optical line terminal 500, and the foregoing and other operations and/or functions of the modules in the apparatus 700 are separately intended to implement corresponding processes of the methods in FIG. 1 to FIG. 3, and for ease of description, details are not described herein again.

Therefore, according to the apparatus for detecting power of an uplink optical signal in this embodiment of the present invention, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

Figure 11:
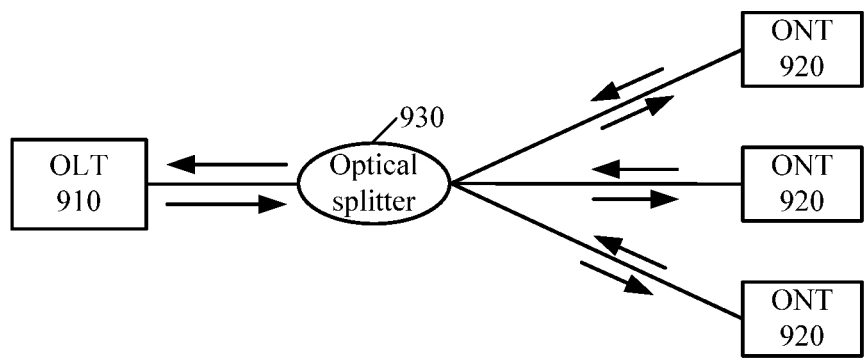
FIG. 11 is a schematic block diagram of an optical network system according to an embodiment.

As shown in FIG. 11, an embodiment further provides an optical network system 900, where the optical network system 900 includes: an OLT 910 according to an embodiment of the present invention; at least one ONT 920; and an optical splitter 930, where: the at least one ONT 920 is connected to the OLT 910 by using the optical splitter 930; and the OLT 910 includes a MAC module and an optical module, where: the MAC module includes a control module, where the control module is configured to separately generate a triggering signal that is used for detecting optical power for each uplink optical signal among multiple uplink optical signals to be detected, where the triggering signal of each uplink optical signal has same duration; and the optical module includes an optical power detecting module, where the optical power detecting module receives the triggering signal that is of each uplink optical signal and generated by the control module, and separately detects power of each uplink optical signal in the duration of the triggering signal of each uplink optical signal.

Therefore, according to the optical network system in this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

Optionally, as an embodiment, before the control module separately generates the triggering signal, which is used for detecting optical power, for each uplink optical signal, the control module is further configured to: separately determine a relationship between a value of uplink bandwidth of each uplink optical signal among the multiple uplink optical signals and a value of a bandwidth threshold; and determine that multiple uplink optical signals whose uplink bandwidth is greater than or equal to the bandwidth threshold are the multiple uplink optical signals to be detected, where uplink duration corresponding to the bandwidth threshold is greater than or equal to the duration of the triggering signal.

Optionally, as an embodiment, the control module is specifically configured to: separately determine a detection time of each uplink optical signal according to a start time of each uplink optical signal; and at the detection time of each uplink optical signal, separately generate the triggering signal, which is used for detecting optical power, for each uplink optical signal.

Optionally, as an embodiment, the control module is specifically configured to: separately determine a detection time of each uplink optical signal according to an end time of each uplink optical signal and the duration; and at the detection time of each uplink optical signal, separately generate the triggering signal, which is used for detecting optical power, for each uplink optical signal.

Optionally, as an embodiment, the MAC module further includes: a dynamic bandwidth allocation (DBA) module, configured to allocate uplink bandwidth to an ONT connected to the OLT; and a processing module, configured to send, through a data channel, to the ONT, the uplink bandwidth allocated by the DBA module, and receive, through the data channel, uplink data sent by the optical module, where the processing module is further configured to send a control signal to the optical module, so as to control the optical module to receive or send an optical signal.

Optionally, as an embodiment, the optical module further includes a control circuit, a drive circuit, and a transmitter, where the control circuit controls the drive circuit according to the control signal sent by the MAC module, so as to drive the transmitter to send a downlink optical signal to the ONT connected to the OLT.

Optionally, as an embodiment, the optical module further includes a receiver and an amplifying circuit, where the receiver is configured to receive an uplink optical signal sent by the ONT connected to the OLT, convert the uplink optical signal into an electrical signal, and output the electrical signal to the amplifying circuit and/or the optical power detecting module; the amplifying circuit amplifies the electrical signal and outputs the amplified electrical signal to the MAC module; and the optical power detecting module detects power of the uplink optical signal according to the triggering signal generated by the control module.

Optionally, as an embodiment, the optical power detecting module includes a charging and discharging circuit, where in a case of triggering of the triggering signal generated by the control module and in the duration of the triggering signal, the charging and discharging circuit charges the charging and discharging circuit by using the electrical signal; and the MAC module is further configured to acquire a voltage value after the charging and discharging circuit performs charging, and determine, according to the voltage value, the power of the uplink optical signal received by the receiver.

Optionally, as an embodiment, the optical module further includes a combiner, where the combiner is configured to combine the downlink optical signal transmitted by the optical module and the received uplink optical signal, and output a combined signal to a trunk optical fiber.

It should be understood that, in this embodiment, for any ONT to be detected, the apparatus for detecting power of an uplink optical signal may first determine a relationship between a value of uplink bandwidth allocated to the ONT to be detected and a value of the bandwidth threshold, so as to determine whether power detection can be performed on the ONT to be detected. When it is determined that the uplink bandwidth allocated to the ONT is greater than or equal to the bandwidth threshold, the apparatus may output a triggering signal with fixed duration to the OLT, so as to trigger power detection for the uplink optical signal; and when it is determined that the uplink bandwidth allocated to the ONT is less than the bandwidth threshold, the apparatus may not output a triggering signal to the OLT and may not perform power detection. However, when no uplink bandwidth allocated to the ONT to be detected in multiple consecutive frames meets a condition, a DBA module of the OLT may dedicatedly allocate relatively large uplink bandwidth used for detection to the ONT to be detected, so that power detection can be performed. This avoids a problem that power detection cannot be performed due to a factor, such as a service volume of the ONT is relatively small. Therefore, not only accuracy and repeatability for measuring power of an uplink optical signal can be improved, but also efficiency of power detection performed by a system can also be improved.

It should further be understood that in this embodiment, the optical line terminal 910 according to this embodiment of the present invention may correspond to an entity for executing the method according to this embodiment, and may further correspond to the apparatus 300 for detecting power of an uplink optical signal, the optical line terminal 500, and the apparatus 700 for detecting power of an uplink optical signal, and the foregoing and other operations and/or functions of the modules in the optical line terminal 910 are separately intended to implement corresponding processes of the methods in FIG. 1 to FIG. 3, and for ease of description, details are not described herein again.

Therefore, according to the optical network system according to this embodiment, triggering signals with same duration are generated for different uplink optical signals to be detected, so that in a case of triggering of the triggering signals, time for charging performed by a charging circuit used to detect optical power is the same and fixed, and therefore accuracy and repeatability for measuring power of an uplink optical signal can be improved.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments, "B corresponding to A" indicates that B is associated with A, and B may be determined according to A. However, it should further be understood that determining B according to A does not mean that B is determined only according to A, and B may be determined according to A and/or other information.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    separately determining a relationship between a value of an uplink bandwidth of each uplink optical signal of a first plurality of uplink optical signals and a value of a bandwidth threshold;
    determining to detect a second plurality of uplink optical signals, wherein the second plurality of uplink optical signals is comprised in the first plurality of uplink optical signals, and wherein the uplink bandwidth of each of the second plurality of uplink optical signals is determined to be greater than or equal to the bandwidth threshold;
    separately generating a plurality of triggering signals for detecting an optical power for each uplink optical signal of the second plurality of uplink optical signals, wherein each triggering signal of the plurality of triggering signals has a same duration, and wherein an uplink duration corresponding to the bandwidth threshold is greater than or equal to the duration of each of the plurality of triggering signals; and
    separately detecting the optical power for each uplink optical signal of the second plurality of uplink optical signals in the duration of the triggering signal of each uplink optical signal of the second plurality of uplink optical signals.

2. The method according to claim 1, wherein separately generating the plurality of triggering signals comprises:
    separately determining a detection time of each uplink optical signal of the second plurality of uplink optical signals according to a start time of each uplink optical signal of the second plurality of uplink optical signals; and
    at the detection time of each uplink optical signal of the second plurality of uplink optical signals, separately generating the triggering signal for each uplink optical signal of the second plurality of uplink optical signals.

3. The method according to claim 1, wherein separately generating the plurality of triggering signals further comprises:
    separately determining a detection time of each uplink optical signal of the second plurality of uplink optical signals according to an end time of each uplink optical signal of the second plurality of uplink optical signals and the duration; and
    at the detection time of each uplink optical signal of the second plurality of uplink optical signals, separately generating the triggering signal for each uplink optical signal of the second plurality of uplink optical signals.

4. The method according to claim 1, wherein a value range of the duration of each of the plurality of triggering signals is from 400 ns to 800 ns or from 500 ns to 700 ns.

5. An apparatus, comprising:
    a processor, configured to:
        separately determine a relationship between a value of an uplink bandwidth of each uplink optical signal of a first plurality of uplink optical signals and a value of a bandwidth threshold; and
        determine to detect a second plurality of uplink optical signals, wherein the second plurality of uplink optical signals is comprised in the first plurality of uplink optical signals, and wherein the uplink bandwidth of each of the second plurality of uplink optical signals is determined to be greater than or equal to the bandwidth threshold;
    a signal generator, configured to separately generate a plurality of triggering signals for detecting optical power for each uplink optical signal of ft the second plurality of uplink optical signals, wherein each triggering signal of the plurality of triggering signals has a same duration, and wherein an uplink duration corresponding to the bandwidth threshold is greater than or equal to the duration of each of the plurality of triggering signals; and
    a detector, configured to separately detect the optical power for each uplink optical signal of the second plurality of uplink optical signals in the duration of the triggering signal of each uplink optical signal of the second plurality of uplink optical signals and generated by the signal generator.

6. The apparatus according to claim 5, wherein the processor is further configured to:
    separately determine a detection time of each uplink optical signal of the second plurality of uplink optical signals according to a start time of each uplink optical signal of the second plurality of uplink optical signals; and
    at the detection time that is of each uplink optical signal of the second plurality of uplink optical signals, separately generate the triggering signal for each uplink optical signal of the second plurality of uplink optical signals.

7. The apparatus according to claim 5, wherein the processor is further configured to:
    separately determine a detection time of each uplink optical signal of the second plurality of uplink optical signals according to an end time of each uplink optical signal of the second plurality of uplink optical signals and the duration; and at the detection time that is of each uplink optical signal of the second plurality of uplink optical signals, separately generate the triggering signal for each uplink optical signal of the second plurality of uplink optical signals.

8. The apparatus according to claim 5, wherein a value range of the duration of each of the plurality of triggering signals is from 400 ns to 800 ns or from 500 ns to 700 ns.

9. An optical line terminal (OLT), comprising:
a Media Access Control (MAC) that comprises a controller that is configured to:
separately determine a relationship between a value of an uplink bandwidth of each uplink optical signal of a first plurality of uplink optical signals and a value of a bandwidth threshold;
determine to detect a second plurality of uplink optical signals, wherein the second plurality of uplink optical signals is comprised in the first plurality of uplink optical signals, and wherein the uplink bandwidth of each of the second plurality of uplink optical signals is determined to be greater than or equal to the bandwidth threshold; and
separately generate a plurality of triggering signals that is used for detecting optical power for each uplink optical signal of the second plurality of uplink optical signals, wherein each triggering signal of the plurality of triggering signals has a same duration, and wherein an uplink duration corresponding to the bandwidth threshold is greater than or equal to the duration of each of the plurality of triggering signals; and
an optical module that comprises an optical power detector that receives the plurality of triggering signals that are generated by the controller, and separately detects the optical power for each uplink optical signal of the second plurality of uplink optical signals in the duration of the triggering signal of each uplink optical signal of the second plurality of uplink optical signals.

10. The optical line terminal according to claim 9, wherein the controller is further configured to:
separately determine a detection time of each uplink optical signal of the second plurality of uplink optical signals according to a start time of each uplink optical signal of the second plurality of uplink optical signals; and
at the detection time of each uplink optical signal of the second plurality of uplink optical signals, separately generate the triggering signal for each uplink optical signal of the second plurality of uplink optical signals.

11. The optical line terminal according to claim 9, wherein the controller is further configured to:
separately determine a detection time of each uplink optical signal of the second plurality of uplink optical signals according to an end time of each uplink optical signal of the second Plurality of uplink optical signals and the duration; and
at the detection time of each uplink optical signal of the second plurality of uplink optical signals, separately generate the triggering signal for each uplink optical signal of the second plurality of uplink optical signals.

12. The optical line terminal according to claim 9, wherein the MAC further comprises:
a dynamic bandwidth allocation (DBA) module, configured to allocate uplink bandwidth to an optical network terminal (ONT) connected to the OLT;
wherein the controller is further configured to send, through a data channel, to the ONT, the uplink bandwidth allocated by the DBA module, and receive, through the data channel, uplink data sent by the optical module; and is further configured to send a control signal to the optical module, so as to control the optical module to receive or send an optical signal.

13. The optical line terminal according to claim 9, wherein the optical module further comprises: a control circuit, a drive circuit, and a transmitter, wherein the control circuit controls the drive circuit according to a control signal sent by the MAC, so as to drive the transmitter to send a downlink optical signal to an optical network terminal (ONT) connected to the OLT.

14. The optical line terminal according to claim 9, wherein the optical module further comprises a receiver and an amplifying circuit;
wherein the receiver is configured to receive a first uplink optical signal sent by an optical network terminal (ONT) connected to the OLT, convert the first uplink optical signal into an electrical signal, and output the electrical signal to the amplifying circuit and/or the optical power detector;
wherein the amplifying circuit amplifies the electrical signal and outputs the amplified electrical signal to the MAC; and
wherein the optical power detector detects power of the first uplink optical signal according to the plurality of triggering signals generated by the controller.

15. The optical line terminal according to claim 14, wherein the optical power detector comprises a charging and discharging circuit, wherein in a case of triggering of the plurality of triggering signals generated by the controller and in the duration of the plurality of triggering signals, the charging and discharging circuit performs charging by using the electrical signal; and
the MAC is further configured to acquire a voltage value after the charging and discharging circuit performs charging, and determine, according to the voltage value, the power of the first uplink optical signal received by the receiver.

16. The optical line terminal according to claim 9, wherein the optical module further comprises a combiner, wherein the combiner is configured to combine a downlink optical signal transmitted by the optical module and a received uplink optical signal, and output a combined signal to a trunk optical fiber.

17. The optical line terminal according to claim 9, wherein a value range of the duration of each of the plurality of triggering signals is from 400 ns to 800 ns or from 500 ns to 700 ns.

18. An optical network system, wherein the optical network system comprises:
the optical line terminal (OLT) according to claim 9;
an optical network terminal (ONT); and
an optical splitter;
wherein the ONT is connected to the OLT by using the optical splitter.

19. An optical line terminal, configured to execute the following steps:
separately determine a relationship between a value of an uplink bandwidth of each uplink optical signal of a first plurality of uplink optical signals and a value of a bandwidth threshold; and
determine to detect a second plurality of uplink optical signals, wherein the second Plurality of uplink optical signals is comprised in the first plurality of uplink optical signals, and wherein the uplink bandwidth of each of the second plurality of uplink optical signals is determined to be greater than or equal to the bandwidth threshold;

separately generate a plurality of triggering signals for detecting optical power for each uplink optical signal of the second plurality of uplink optical signals, wherein each triggering signal of the plurality of triggering signals has a same duration, and wherein an uplink duration corresponding to the bandwidth threshold is greater than or equal to the duration of each of the plurality of triggering signals; and separately detect the optical power for each uplink optical signal of the second plurality of uplink optical signals in the duration of the triggering signal of each uplink optical signal of the second plurality of uplink optical signals.

20. The optical line terminal according to claim 19, wherein separately generating the plurality of triggering signals comprises:

separately determining a detection time of each uplink optical signal of the second plurality of uplink optical signals according to a start time of each uplink optical signal of the second plurality of uplink optical signals; and at the detection time of each uplink optical signal of the second plurality of uplink optical signals, separately generating the triggering signal for each uplink optical signal of the second plurality of uplink optical signals.

21. The optical line terminal according to claim 19, wherein separately generating the plurality of triggering signals comprises:

separately determining a detection time of each uplink optical signal of the second plurality of uplink optical signals according to an end time of each uplink optical signal of the second plurality of uplink optical signals and the duration; and at the detection time of each uplink optical signal of the second plurality of uplink optical signals, separately generating the triggering signal for each uplink optical signal of the second plurality of uplink optical signals.

22. The optical line terminal according to claim 19, wherein a value range of the duration of each of the plurality of triggering signals is from 400 ns to 800 ns or from 500 ns to 700 ns.

23. An apparatus, comprising a processor, a memory, and a bus system;

wherein the processor and the memory are connected to each other by the bus system, the memory is configured to store an instruction, and the processor is configured to execute the instruction saved by the memory;

wherein the processor is further configured to:

separately determine a relationship between a value of an uplink bandwidth of each uplink optical signal of a first plurality of uplink optical signals and a value of a bandwidth threshold; and determine to detect a second plurality of uplink optical signals, wherein the second plurality of uplink optical signals is comprised in the first plurality of uplink optical signals, and wherein the uplink bandwidth of each of the second plurality of uplink optical signals is determined to be greater than or equal to the bandwidth threshold;

separately generate a plurality of triggering signals for detecting optical power for each uplink optical signal of the second plurality of uplink optical signals, wherein each triggering signal of the plurality of triggering signals has a same duration, and wherein an uplink duration corresponding to the bandwidth threshold is greater than or equal to the duration of each of the plurality of triggering signals; and separately detect the optical power for each uplink optical signal of the second plurality of uplink optical signals in the duration of the triggering signal of each uplink optical signal of the second plurality of uplink optical signals.

24. The apparatus according to claim 23, wherein separately generating the plurality of triggering signals for each uplink optical signal of the second plurality of uplink optical signals comprises:

separately determining a detection time of each uplink optical signal of the second plurality of uplink optical signals according to a start time of each uplink optical signal of the second plurality of uplink optical signals; and at the detection time of each uplink optical signal of the second plurality of uplink optical signals, separately generating the triggering signal for each uplink optical signal of the second plurality of uplink optical signals.

25. The apparatus according to claim 23, wherein separately generating the plurality of triggering signals for each uplink optical signal of the second plurality of uplink optical signals comprises:

separately determining a detection time of each uplink optical signal of the second plurality of uplink optical signals according to an end time of each uplink optical signal of the second plurality of uplink optical signals and the duration; and at the detection time of each uplink optical signal of the second plurality of uplink optical signals, separately generating the triggering signal for each uplink optical signal of the second plurality of uplink optical signals.

26. The apparatus according to claim 23, wherein a value range of the duration of each of the plurality of triggering signals is from 400 ns to 800 ns or from 500 ns to 700 ns.

* * * * *